United States Patent Office

3,055,859
Patented Sept. 25, 1962

3,055,859
IMPACT - RESISTANT PLASTIC COMPOSITIONS COMPRISING A STYRENE POLYMER AND A CROSS-LINKED ACRYLIC ACID ESTER POLYMER, AND PROCESS FOR PREPARING SAME
Bruno Vollmert, Ludwigshafen (Rhine), Germany, assignor to Badische Anilin- & Soda-Fabrik Aktiengesellschaft, Ludwigshafen (Rhine), Germany
No Drawing. Filed Sept. 24, 1957, Ser. No. 685,990
Claims priority, application Germany Sept. 28, 1956
13 Claims. (Cl. 260—45.5)

This invention relates to impact-resistant plastic (synthetic resin) compositions containing a hard polymer and a cross-linked saturated rubberlike polymer. The invention also relates to methods for the production of such impact-resistant plastic compositions.

It is known that by mixing polystyrene or other hard and brittle polymers with natural rubber or butadiene polymers it is possible to obtain thermoplastic synthetic compositions which after they have been shaped or molded exhibit a high resistance to shock and impact. These impact-resistant compositions exhibit, by reason of the unsaturated character of the rubber component, a certain susceptibility to air, especially under the action of light, so that when they are weathered in the open air they lose their good mechanical properties again.

When rubberlike polymers which are saturated and therefore stable to ageing, such as polyacrylic acid esters or polyisobutylene, however, are mixed with hard polymers, for example polystyrene, to preclude the said disadvantage, there are obtained thermoplastic compositions having different kinds of properties depending on the choice of components and the method of mixing, but not those of the character of impact-resistant polystyrene, which is characterized by a combination of hardness (high resistance to deformation) and toughness (unbreakability upon impact and shock). If the mixture of the components is carried out in the form of polymer dispersions, such as are obtained by emulsion polymerization, there are obtained after drying the mixtures, for example by atomizing drying or on spray rollers, and molding, for example by injection molding methods, products which indeed have a certain toughness with slow deformation but of which the resistance to impact is completely unsatisfactory and usually lies far below the values for pure polystyrene.

Similar unsatisfactory results are obtained when saturated rubberlike copolymers which contain large amounts of monomers forming the hard component as components of the copolymers are mixed with the hard polymers, for example when a copolymer derived from butyl acrylate and styrene in the mol ratio 1:1 is mixed with polystyrene. In this way products are obtained of which the softening point, as compared with the hard component, is always greatly lowered. At room temperature they are either hard and brittle (when the content of copolymer is small, for example below 30%) or tough and soft (when the content of copolymer is high, for example over 30%). The desired combination of the properties hardness and toughness is lacking.

Synthetic compositions which are obtained by mixing pure homopolymers or by polymerizing a solution of the rubberlike polymer in a monomer which forms a hard polymer, are also unsatisfactory. In both cases there are formed soft, friable products which often can hardly be rolled out into a sheet, and which are quite unsuitable for further working up, for example by injection molding. Such soft compositions without firm cohesion are obtained for example by rolling mixtures of polyacrylic acid esters and polystyrene in the ratio 10:90 to 50:50. The properties of such mixtures cannot be improved even by prolonged mechanical working on rollers or in mixing screws.

The object of the present invention is to provide impact-resistant plastic compositions of improved properties. A more specific object of the invention is to provide impact-resistant plastic compositions which contain a mixture of a hard polymer and a cross-linked saturated rubberlike polymer. Another object of the invention is to provide impact-resistant plastic compositions which contain a hard polyvinyl compound and a saturated rubberlike polyvinyl compound. Another important object of this invention is the provision of impact-resistant plastic compositions in which a hard polyvinyl compound is cross-linked with a saturated rubberlike polyvinyl compound, the rubberlike polyvinyl compound preferably also being cross-linked in another way. A still more specific object of this invention is to provide impact-resistant plastic compositions which contain as hard component a styrene polymer and as rubberlike component an acrylic ester polymer.

Among the objects of the present invention are also methods for the production of impact-resistant plastic compositions which contain mixtures of a hard polymer and a cross-linked saturated rubberlike polymer. Another specific object of the invention is a process according to which hard and cross-linked rubberlike polyvinyl compounds are mixed in order to obtain impact-resistant compositions. According to another method, which is included in the objects of this invention, the impact-resistant plastic compositions are obtained by mixing a hard and a rubberlike polymer while simultaneously carrying out cross-linking reactions.

A further preferred object of the present invention is a process for the polymerization of a monomeric vinyl compound which forms hard homopolymers in the presence of a saturated rubberlike compound, the said rubberlike compound being present in the cross-linked condition at least towards the end of the polymerization reaction for the formation of the hard homopolymer.

Other important objects of the invention are methods for the production of impact-resistant plastic compositions according to which a hard polyvinyl compound is cross-linked with a saturated rubberlike polyvinyl compound, the rubberlike polyvinyl compound preferably also being cross-linked in another way.

Among the objects of the invention there are also included methods for improving the physical properties of impact-resistant plastic compositions by a mechanical treatment at elevated temperature.

These and other objects and advantages of the invention, which will become evident in detail from the following description and the examples, are achieved by preparing mixtures of a hard polymer, for example a hard styrene polymer, such as polystyrene, and a substantially saturated cross-linked rubberlike polymer, for example an acrylic ester polymer.

The concentration of the rubber component in the total mixture depends on the nature of the rubberlike polymer and should preferably lie between 3 and 50% by weight, advantageously between 5 and 20% by weight, of the total mixture.

By saturated polymers which are rubberlike at room temperature we mean rubberlike polymers or copolymers in the formation of which at the most inconsiderable amounts of dienes, and preferably no dienes at all, have taken part. The expression "inconsiderable amounts of dienes" means that the amount of dienes, for example butadiene or isoprene, taking part as copolymer components in the synthesis of the rubberlike polymers shall not be so large that by their presence alone the production of impact-resistant mixtures is rendered possible. The proportion of any dienes present should also be so small that the impact-resistant compositions do not exhibit any ageing which is greater than that of pure polystyrene. As a limiting value for the fulfilment of these conditions there may be given for example a maximum diene content of about 2% by weight, preferably 0.5% by weight, with reference to the total weight of the impact-resistant plastic mixture.

Suitable rubberlike polymers are not only those which exhibit pronounced rubber-elastic properties, but also other polymers which are tough-soft and flexible at room temperature even if they only possess the property of rubber-elasticity to a slight extent and have for example a small rebound elasticity and a high permanent deformation.

For the production of the saturated polymers which are rubberlike at 20° C. there are suitable for example acrylic esters, vinyl ethers or isobutylene. Among the acrylic ester and vinyl ether polymers those with a low freezing temperature are especially of interest, for example the polymers of the acrylic esters and vinyl ethers of ethyl alcohol, propyl alcohol, normal butyl alcohol, isobutyl alcohol, amyl alcohol, hexyl alcohol, ethyhexyl alcohol and the acrylic esters and vinyl ethers of ether alcohols, as for example acrylic esters and vinyl ethers of monoethers of ethylene, propylene, butylene and hexamethylene glycol or other glycols with methanol, ethanol, propanol, normal butanol, isobutanol, ethylhexanol and the like. Copolymers of the said monomers with each other or with other vinyl monomers, for example styrene or acrylonitrile, may also be used. These polymers should preferably contain at least 50% by weight of one or more monomers yielding a homopolymer which is soft and rubberlike at 20° C.

Crosslinked saturated rubberlike polymers can readily be prepared in known manner by copolymerization of the said or similar monomers with small amounts of divinyl, diallyl or vinylallyl compounds, for example divinyl ethers of glycols, such as divinyl ethers of ethylene, propylene, butylene and hexamethylene glycol, diacrylic or dimethacrylic esters of glycols, such as the diesters of acrylic and/or methacrylic esters and ethylene, propylene, butylene and hexamethylene glycol, divinylbenzene, fumaric acid diallyl ester, acrylic acid or methacrylic acid allyl ester, dialkyl oxalate, diallyl phthalate, triallyl cyanate and the like.

The cross-linked saturated rubberlike polymers may, however, also be prepared from saturated rubberlike polymers which contain reactive cross-linkable groups, by cross-linking reactions which take place during or after the polymerization reaction. For this purpose the un-cross-linked saturated rubberlike polymers must contain reactive groups which can react with cross-linking. Such reactive functional groups may be introduced into the rubberlike polymers during their preparation by copolymerization with small amounts of suitable monomeric compounds which contain functional groups. Suitable monomeric compounds containing functional groups are, for example, acrylic acid, methacrylic acid, acrylamide, methacrylamide, maleic anhydride, monoacrylic acid esters of glycols, as for example 1.4-butane-diol monoacrylate, monovinyl ethers of glycols, as for example 1.4-butane-diol monovinyl ether, isocyanatoalkyl acrylates or isocyanato vinyl ether, aminoalkyl acrylates, aminovinyl ethers and epoxyalkyl acrylates or epoxyvinyl ethers. It is also possible, however, to produce reactive functional groups in rubberlike polymers subsequently by chemical reactions, for example by saponificaion of a polymer with ester groups. Thus for example carboxylic or carboxylic acid anhydride groups can be obtained in a rubberlike polymer on the one hand by copolymerization of monomers which form rubberlike polymers with acrylic acid, methacrylic acid or maleic anhydride and on the other hand by partial saponification of a rubberlike polymer containing an ester of these acids.

In an analogous way, polymers containing hydroxyl groups can be obtained by partial saponification of rubberlike vinyl ester copolymers or by copolymerization of monomers which form rubberlike polymers with small amounts of a polymerizable compound containing hydroxyl groups, such as unsaturated monoesters or monoethers of polyhydric alcohols, for example butane-diol monoacrylate or butane-diol monovinyl ether. Other functional groups which may be present in the rubberlike polymers are for example acid amide, amino, epoxy or isocyanate groups.

As hard polymers, various hard polyvinyl compounds which as a rule are brittle at room temperature are of interest. Such polyvinyl compounds are for example the homo- and copolymers of styrene, vinyl chloride, methacrylic acid methyl ester, acrylic acid hexyl ester, acrylic acid decalyl ester, methacrylic acid cyclohexyl ester, methacrylic acid decalyl ester, cyclohexyl and decalyl vinyl ethers, acrylonitrile and vinyl acetate.

Among the hard and brittle polymers which can be used according to this invention, a special importance attaches to polymers which contain preponderating amounts of styrene and/or styrene derivatives, such as alkyl- or halogenstyrenes. Copolymers of a styrene with methyl methacrylate or acrylonitrile, for example copolymers of 60 to 80% of styrene and 40 to 20% of acrylonitrile, are also of interest. The K-value (according to Fikentscher) of these hard polymers should preferably be at least about 30 and is advantageously between 40 and 120.

The impact-resistant plastic compositions according to this invention may be prepared in different ways, for example by mixing already cross-linked rubberlike polymers with the hard brittle polymers, or by mixing not yet cross-linked rubberlike polymers which, however, contain functional groups with the hard polymers while simultaneously or subsequently cross-linking the rubberlike polymers. The said crosslinking can be effected by various reactions. Thus for example it is possible to prepare saturated rubberlike polymers which contain different functional groups which are capable of reacting with each other with the formation of cross-linking. As examples of such different functional groups there may be mentioned carboxylic and hydroxyl, or amino and isocyanate groups. It is also possible, however, to use rubberlike saturated polymers which contain functional groups of only one kind and to react these functional groups with functional groups of other compounds with the formation of cross-linking. Thus for example a rubberlike polymer with carboxylic groups can be cross-linked with a rubberlike polymer containing hydroxyl groups. For cross-linking rubberlike polymers with reactive compounds there are also suitable, however, compounds of low molecular weight, for example substances having a molecular weight lower than 1000, such as polyhydric alcohols, polycarboxylic acids, polyisocyanates and the like. As examples of functional groups which are suitable for the formation of cross-linking and which can be present either in the rubberlike polymer with reactive groups or in the compounds which are to react with the rubberlike polymer with the formation of crosslinking, there may be mentioned as a summary hydroxyl, carboxylic, acid anhydride, acid amide, amino, epoxy or isocyanate groups.

It is of special interest according to this invention to use hard polymers with reactive groups and thereby to cross-link the rubberlike saturated polymer. In order to be able to cause a cross-linking reaction between these two polymers, the functional groups in the individual components should be chosen so that a cross-linking action between the two is possible. For example the one component can contain hydroxyl groups and the other component carboxylic groups. Saturated rubberlike polymers which are already cross-linked and which still contain reactive functional groups for reaction with the hard and brittle polymers which similarly contain reactive groups, are especially well suited for the production of plastic compositions according to this invention. The said cross-linked rubberlike polymers with reactive groups can be prepared by various methods. For example monomeric compounds which form saturated rubberlike polymers, such as butyl acrylate or isobutylene, can be copolymerized with small amounts of a polymerizable compound containing functional groups and with small amounts of a divinyl, diallyl or a vinylallyl compound, for example divinylbenzene, alkane-diol diacrylic acid esters, alkane-diol divinyl ethers or diallyl phthalate. The cross-linking of the rubberlike polymers can, however, also be effected by subsequently adding to the rubberlike polymer (for example during mixing with the hard polymer) compounds which are not polymerizable but are capable of reacting with the functional groups of the saturated rubberlike polymer with cross-linking. Suitable polyfunctional compounds of this kind are for example polyalcohols, polycarboxylic acids, polyamines, polyisocyanates, polyepoxides or compounds which contain a plurality of ethylene imine groups, such as succinic, glutaric, adipic or pimelic acid, butylene or hexamethylene diamine, hexamethylene di-isocyanate, toluylene diisocyanate, ethylene glycol, butane-diols or propane-diols. Saturated polyesters, for example from adipic acid or sebacic acid and glycols, which bear hydroxyl, carboxylic or isocyanate groups at the end of the chain are, however, also useful as cross-linking agents. As polyfunctional cross-linking agents there are finally also suitable polymers with reactive groups. These various polyfunctional cross-linking agents which can cause a cross-linking reaction between the molecules of the rubberlike polymer have in common the fact that they are not polymerizable and that they react with the functional groups of the rubberlike polymer at the latest upon heating.

In the cross-linking of a rubberlike polymer with a hard polymer, the concentration of the functional groups in the rubber component, for example the carboxylic or hydroxyl groups, is preferably such that the whole reaction mixture including the hard component contains 0.01% to 3%, advantageously 0.1% to 1% of COOH groups or an equivalent amount of other functional groups, thus for example 0.04 to 0.4% of OH groups. The proportion of the corresponding functional groups of the hard and brittle polymer component is preferably such that these groups are present in an or an about equivalent amount or in excess. A part of the functional groups of the rubberlike polymer can be used for cross-linking the saturated rubberlike component by a non-polymerizable polyfunctional compound, so that only the remainder is still available for reaction with the functional groups of the hard polymer. The most favorable distribution ratio of the functional groups reacting with the functional groups of the rubberlike component to the polyfunctional compound added for cross-linking the rubberlike component, and the hard polymer is preferably determined by experiment for each particular combination. It depends for example on the degree of polymerization of the polymers taking part and on the ease of reaction of the functional groups used. For example a distribution in the ratio 50:50 often proves advantageous.

The saturated rubberlike polymers may be mixed with the hard and brittle polymers in different ways. For example it is possible to bring the two components together in emulsion, in solution or as solid polymers.

In preparing the mixture it is often of advantage to mix the cross-linked saturated rubber-like polymers with a monomer capable of forming hard homopolymers and to polymerize the mixture so prepared. As a result of their cross-linked structure these rubberlike polymers are not dissolved, but swelled in the monomers. The polymerization of the gel mixtures can be practiced by the block-, solution-, bead- or emulsion-polymerization method. Which of these methods is to be preferred in practice basically depends on the state of the cross-linked saturated rubber-like polymer. For example, if it is a dispersion prepared by emulsion polymerization, it will be good practice to mix the monomer forming the hard homopolymer with this dispersion and to carry out the polymerization of the mixture by the emulsion-polymerization method.

In this case as well it will be found to be of advantage if the cross-linked saturated rubber-like polymer is cross-linked with the hard and brittle polymer by way of functional groups. For this purpose, for example, a cross-linked saturated rubberlike polymer which still contains functional groups in the chain is mixed with a monomer forming hard homopolymers, while adding a polymerizable compound bearing such functional groups as are capable of reacting with the functional groups of the rubberlike polymer with the formation of cross-linkages, the mixture then being polymerized.

A special and preferred embodiment of the invention consists in dissolving the still uncross-linked rubberlike polymer which contains small amounts of a functional group in the chain in the monomer of the hard component to be incorporated, mixing with the solution a non-polymerizable polyfunctional compound which is capable of reaction with the functional groups of the rubber component with cross-linking, and then polymerizing the solution, the cross-linking reaction taking place or being caused during or after the polymerization depending on the character of the functional groups.

Also in this embodiment of the invention it is of interest to prepare impact-resistant plastic compositions in which the saturated rubberlike polymer is cross-linked by reactive groups with the hard polymer.

For this purpose solutions of a polymer which is rubberlike at room temperature and which contains functional groups in small amounts, in a mixture of a liquid polymerizable compound which by itself forms hard and brittle homopolymers, and a small amount of a polymerizable compound which contains functional groups which are capable of reacting with the functional groups of the saturated rubberlike polymer with the formation of a main valency linkage, are polymerized and the mixture heated to elevated temperature during or after the polymerization. As polymerizable compounds with reactive functional groups there come into question for example monoacrylic esters of glycols, acrylic acid or acrylamide. Also in this embodiment of the invention it is specially advantageous if the molecules of the rubberlike polymer, in addition to their cross-linking by the molecules of the hard polymers, are also directly cross-linked to one another. This is effected in a simple manner by adding to the solution of the saturated rubberlike polymers in monomers of the hard components not only the polymerizable compound with reactive groups but also a polyfunctional non-polymerizable compound which is capable of reacting with the functional groups of the rubberlike polymer with cross-linking, thus for example a glycol if the rubberlike polymer contains COOH groups or isocyanate groups. The polymerization of the solution can be carried out by the block-, solution-, bead-, precipitation- or emulsion-polymerization method.

The invention is not limited to mixing one hard polymer with one saturated rubberlike polymer, but the rubber component in particular can consist of two or more rubberlike polymers or copolymers.

It has been found to be especially advantageous to use, besides a polymer which has pronounced rubberlike properties, also a further rubberlike polymer which has a certain affinity to the hard and brittle polymer contained in the plastic composition.

It is preferable to use two rubberlike polymers which are partly built up from the same monomers. The one rubberlike polymer should preferably contain at least 10 mol percent, but more preferably 30 to 60 mol percent, of one of the monomers from which the hard polymer is prepared, besides softening monomers, such as acrylic esters. The second rubberlike polymer should preferably be built up to the extent of at least 70 mol percent, but more preferably to the extent of at least 75 to 100 mol percent, of softening monomers.

In such plastic compositions containing a plurality of saturated rubberlike components, all components can be combined through the functional groups with the hard polymers. It is, however, also possible to unite only one of the rubberlike components with the hard polymer and to crosslink all the participating rubberlike polymers with each other, for example by the addition of a non-polymerizable polyfunctional compound of which the functional groups are capable of reacting with the functional groups present in the rubber polymers with cross-linking. The individual rubberlike polymers participating in the mixture can also have different functional groups so that the functional groups of the rubber polymer I are capable of reacting with the functional groups of the rubber polymer II. One kind of functional group should be present in excess so that there still remain functional groups available for the reaction with the suitably chosen groups of the hard polymer. Moreover one or other of the rubberlike polymers can itself additionally cross-link. The possibilities of variation are increased by the fact that the individual rubberlike polymers taking part can have different degrees of polymerization. Such a mixture could for example consist of the following components:

(1) Hard polymer: Styrene polymer with small amount of OH groups.
(2) Rubberlike polymer I: Copolymer of butyl acrylate and styrene with small amount of COOH groups (in excess).
(3) Rubberlike polymer II: polybutylacrylate with small amount of OH groups.
(4) Small amounts of butane-diol: for cross-linking the rubberlike polymer I.

Also in such mixtures it is especially suitable to dissolve the rubberlike polymers in monomers of the hard components and to polymerize the solution after the addition of the compounds with functional groups necessary to produce the cross-linking according to this invention.

In so far as the cross-linking reaction does not take place during the preparation of the polymers or the mixtures, it is preferable to cause or complete it by prolonged heating at elevated temperature, for example heating for 20 to 30 hours at 150° to 200° C. It is advantageous to carry out this heating in vacuo or under an inert gas. Although it is also possible to carry out the reaction in solution, for example in benzene with the addition of sulfuric acid or para-toluenesulfonic acid as catalyst, it is preferred to work without the addition of solvents or diluents because working up by precipitation, for example with methanol, is considerably more troublesome.

After heating the mixtures there are obtained translucent white insoluble and infusible products which are not directly suitable for many purposes of use. The cross-linked compositions may, however, be rendered thermoplastic again by a mechanical degradation process at elevated temperature. This is effected in a simple manner by a mechanical treatment at elevated temperature, for example at 100° to 180° C., in a kneading machine or on rollers with a narrow gap, the cylinders of which have different rotational speeds. By the shear stresses occurring in this treatment, a mechanical degradation takes place. A more or less large number of linkages, depending on the nature and duration of the kneading process, are broken so that thermoplastic and soluble products are formed which probably have a branched structure. A degradation of the polymers beyond the stage of solubility in organic solvents, such as toluene or benzene, is not necessary. It is, however, often not necessary to degrade the plastic compositions until they are completely soluble in order to obtain the best mechanical properties. The nature and duration of the kneading process are of importance for the mechanical properties of the moldings produced from the products, so that for each composition the optimum conditions should be ascertained by preliminary experiment. In many cases a treatment for 1 to 30, but preferably 5 to 20, minutes on a roller apparatus at 130° to 150° C. is suitable. Continuously acting kneading screws of various constructions are, however, also suitable for carrying out the mechanical treatment. The degradation temperature should in general lie 20° to 100° C., preferably 40° to 70° C., above the softening point of the hard polymer.

The following examples will further illustrate this invention but the invention is not restricted to these examples. The parts specified in the examples are parts by weight.

*Example 1*

I. 960 parts of butyl acrylate and 40 parts of acrylic acid are mixed with 1,000 parts of acetone and after the addition of 1 part of azo-isobutyronitrile and 1 part of dodecyl mercaptan, kept gently boiling under reflux for 6 to 8 hours. The acetone is then evaporated. The rubberlike copolymer has a K-value of 60 according to Fikentscher in benzene.

II. 1,000 parts of styrene and 9.5 parts of 1.4-butane-diol monoacrylate are polymerized in 2,000 parts of water with the addition of 5 parts of polyvinylpyrrolidone as protective colloid and 2 parts of benzoyl peroxide with powerful stirring for 36 hours at 75° C. The bead polymer obtained is washed and dried.

170 parts of the rubberlike polymer I and 830 parts of the hard and brittle polymer II are mixed in an endless screw with the simultaneous addition of 2.5 parts of 1.4-butane-diol at 150° C.

The mixture is heated under nitrogen for 24 hours at 180° C. and then treated for 10 minutes on rollers running with friction (17–21 r.p.m., gap 0.05 mm.) at 140° C. The impact strength of standard rods prepared therefrom by injection molding (injection temperature 180° C.) amounts to 60 kg. cm. cm.$^{-2}$ tested according German standards DIN 53453 with a softening point of 97° C. according to Vicat.

A mixture of 170 parts of polybutyl acrylate with 830 parts of polystyrene prepared on roller, however, gives soft inhomogeneous masses which cannot be worked up by injection molding.

*Example 2*

150 parts of the butyl acrylate-acrylic acid copolymer I from Example 1 is dissolved in 850 parts of styrene in a kneader and, after mixing with 6 parts of 1.4-butane-diol monoacrylate, 1.3 parts of 1.4-butane-diol and 1 part of azo-isobutyronitrile, polymerized under nitrogen first for 24 hours at 60° C., then for 12 hours at 140° C., and finally for 12 hours at 170° to 180° C. The block polymer is comminuted and heated in vacuo (0.1 mm. Hg) for 15 hours at 150° C. The mass, which is insoluble in all solvents, is rolled at 140° C. for 10 minutes, as described in Example 1, whereby it becomes soluble in benzene. Standard articles injection molded from the mass obtained give the following test values:

Impact strength: 95 to 70 kg. cm. cm.$^{-2}$ at injection temperatures of 180° to 260° C.
Notch impact strength: 12.5 kg. cm. cm.$^{-2}$ (mean value).
Tensile strength: 480 kg. cm.$^{-2}$.
Bending strength: 805 kg. cm.$^{-2}$.
Martens number: 72.5° C.
Vicat number: 99° C.
Water imbibition: 0.13%.

On the contrary a usual "graft" polymer, which has been prepared by dissolving a polybutyl acrylate in styrene and effecting block polymerization of the solution, yields upon rolling a soft and nevertheless friable "sheet" which is unsuitable for any known further technical use.

Example 3

150 parts of a solution polymer derived from 960 parts of isobutyl acrylate and 40 parts of acrylic acid are dissolved in 850 parts of styrene, and, after mixing therewith 8 parts of ethylene glycol monoacrylate and 1 part of di-isopropyl-benzene-mono-hydroperoxide, heated under nitrogen for 12 hours at 70° C., 12 hours at 80° C., 12 hours at 140° C. and 12 hours at 180° C. After comminution, the product is heated for 24 hours in vacuo (0.1 mm. Hg) at 140° C. and masticated for 10 minutes at 140° C. on rollers running with friction. A hard, tough sheet is formed which is suitable for the production of impact-resistant injection molding compositions. The average impact strength is 40 kg. cm. cm.$^{-2}$.

Example 4

I. An emulsion consisting of 2,000 parts of water, 10 parts of an alkyl ($C_{12}$ to $C_{14}$) sulfonate, 800 parts of ethylhexyl acrylate, 150 parts of acrylonitrile, 50 parts of styrene and 50 parts of butane-diol monoacrylate, is polymerized at 60° C. under nitrogen after the addition of 1 part of potassium persulfate. The polymer dispersion is precipitated by the addition of methanol. The copolymer is washed with methanol and then dried.

II. A mixture of 54 parts of styrene, 96 parts of ethylhexyl acrylate and 7.5 parts of methacrylic acid is mixed with 200 parts of acetone and, after dissolving therein 0.1 part of azoisobutyronitrile, polymerized for 60 hours under nitrogen with a weak reflux. The solution is evaporated at 50° to 60° C.

200 parts of the copolymer I and 150 parts of the copolymer II are dissolved in a mixture of 525 parts of styrene and 225 parts of acrylonitrile and polymerized, after the addition of 5 parts of 1.4-butane-diol monoacrylate, 2.5 parts of 1.4-butane-diol and 1 part of azo-isobutyronitrile, between chromed metal plates (distance between plates 5 mm.) under nitrogen for 30 hours at 65° C. The plastic plate obtained is comminuted and treated for 10 minutes on a roller at 150° C. After comminuting the rolled sheet, a material eminently suitable for working up by injection molding is obtained which yields injection moldings of high impact strength.

Example 5

I. 750 parts of normal butyl acrylate, 250 parts of styrene and 87 parts of a mixture of 77% of 1.4-butane-diol monoacrylate and 23% of 1.4-butane-diol diacrylate are polymerized, after the addition of 10 parts of an alkyl ($C_{12}$ to $C_{14}$) sulfonate, 2,000 parts of water, 2 parts of normal dodecylmercaptan and 1 part of potassium persulfate, for 5 hours under nitrogen at 60° C.

II. 550 parts of normal butyl acrylate, 450 parts of styrene, 20 parts of acrylic acid, 10 parts of an alkyl ($C_{12}$ to $C_{14}$) sulfonate, 2,000 parts of water and 1 part of potassium persulfate are polymerized under nitrogen for 5 hours at 60° C.

The two polymer dispersions I and II are mixed and precipitated by the addition of 5% common salt solution. The precipitated polymer mixture is thoroughly washed with water and dried at 50° C.

300 parts of the saturated rubberlike mixture thus prepared are mixed in a continuous kneader with 700 parts of a copolymer derived from 1,000 parts of styrene and 3 parts of acrylic acid. The homogeneous mixture is heated for 12 hours at 140° C. in vacuo and then again passed through the kneader.

An impact-resistant product with good thermal stability is obtained in this way.

Example 6

I. 750 parts of normal butyl acrylate, 250 parts of styrene and 50 parts of acrylic acid are dissolved in 600 parts of acetone and after the addition of 1 part of azo-isobutyronitrile polymerized for 36 hours under nitrogen at reflux temperature. The polymer solution is dried at 50° to 60° C. The copolymer has a K-value of 52 according to Fikentscher in benzene.

II. 550 parts of normal butyl acrylate, 450 parts of styrene and 40 parts of 1.4-butane-diol monoacrylate are polymerized under nitrogen for 5 hours at 60° C. after the addition of 2,000 parts of water, 10 parts of an alkyl ($C_{12}$ to $C_{14}$) sulfonate and 1 part of potassium persulfate. The polymer emulsion is precipitated and the precipitate washed and dried. The copolymer has a K-value in benzene of 140 according to Fikentscher.

150 parts of the rubberlike solution polymer I and 150 parts of the rubberlike emulsion polymer II are dissolved in a kneader in 700 parts of styrene with the addition of 4 parts of 1.4-butane-diol monoacrylate, 2.5 parts of butane-diol and 1 part of azo-isobutyronitrile. The waxy tough mixture is polymerized under nitrogen first for 24 hours at 60° C., then for 12 hours at 80° C., 12 hours at 140° C. and finally 12 hours at 180° C. The comminuted block polymer is kept at 130° C. in vacuo (0.5 mm. Hg) for 24 hours and then treated for 10 minutes at 140° C. on a roller running with friction (17–21 r.p.m., gap width 0.1 mm.). The impact strength of the composition thus obtained, measured on standard injection molded rods, amounts on an average to 90 to 100 kg. cm. cm$^{-2}$ over an injection temperature range of 180° to 260° C. A special advantage of the plastic composition thus prepared consists in the fact that in the case of thin-walled injection moldings, the strength is equally good in all directions, independently of the direction of flow during the injection molding process.

Example 7

I. An emulsion consisting of 2,000 parts of water, 10 parts of an alkyl ($C_{12}$ to $C_{14}$) sulfonate, 960 parts of butyl acrylate, 40 parts of acrylic acid, 2.5 parts of 1.4-butane-diol diacrylate, 1 part of potassium persulfate and 2.5 parts of dodecyl mercaptan is polymerized under nitrogen for 5 hours at 60° to 65° C. (K-value according to Fikentscher in benzene about 50).

II. An emulsion consisting of 2,000 parts of water, 10 parts of an alkyl ($C_{12}$ to $C_{14}$) sulfonate, 530 parts of butyl acrylate, 430 parts of styrene, 40 parts of 1.4-butane-diol monoacrylate and 1 part of potassium persulfate is polymerized under nitrogen for 5 hours at 60° C. (K-value according to Fikentscher in benzene about 150).

III. An emulsion consisting of 2,000 parts of water, 10 parts of an alkyl ($C_{12}$ to $C_{14}$) sulfonate, 994 parts of styrene, 6 parts of 1.4-butane-diol monoacrylate, 1 part of potassium persulfate and 1 part of normal dodecyl mercaptan is polymerized under nitrogen at a pH of 8.5 for 6 hours at 65° C. (K-value according to Fikentscher in benzene about 70).

IV. 994 parts of styrene are polymerized with 6 parts of 1.4-butane-diol monoacrylate and 1 part of azo-isobutyronitrile under nitrogen first for 24 hours at 60° C., then for 24 hours at 120° C. (K-value according to Fikentscher about 70).

150 parts of emulsion I, 150 parts of emulsion II and 200 parts of emulsion III are mixed and dried on a spray roller drier. 500 parts of the resultant granular powder are mixed with 500 parts of the polymer IV in an endless screw. The granulate thus prepared is kept for 24 hours at 180° C. under nitrogen free from oxygen and treated for 10 minutes on a roller running with friction at 140° C.

A homogeneous white translucent plastic composition is obtained which can be worked up by injection molding or vacuum deep drawing to shaped articles having high impact strength and good thermal stability.

Example 8

138 parts of butyl acrylate and 12 parts of 1.4-butane-diol monoacrylate are dissolved in 150 parts of acetone and, after the addition of 0.1 part of normal dodecyl mercaptan and 0.15 part of azo-isobutyronitrile, polymerized under nitrogen while heating with a moderate acetone reflux. After 6 hours the polymer solution is transferred to a vessel having a powerful stirrer. The acetone is distilled off while stirring, towards the end in vacuo at 130° C. The remaining polymer containing hydroxyl groups is dissolved while cooling in a mixture of 845.5 parts of styrene, 3 parts of acrylic acid and 1.5 parts of adipic acid. The solution thus obtained is continuously polymerized first in a stirring vessel at 80° C. and then in an endless screw machine. The screw is heated in zones as follows: First zone 135° C., second zone 180° C., third zone 200° C. and fourth zone 220° C. The rotational speed of the screw is adjusted so that the residence time in the stirring vessel is 48 hours and in each zone 8 hours. The cross-linked and insoluble polymer passes through a perforated plate in the form of strings into the open air and is then mechanically aftertreated in a double endless screw machine. The polymer can here be modified by the addition of lubricants, pigments and dyestuffs. An impact-resistant polystyrene is obtained with good mechanical and thermal properties and a good capacity for flowing.

Example 9

200 parts of isobutyl acrylate, 0.4 part of 1.4-butane-diol diacrylate and 8 parts of acrylic acid, 400 parts of desalted water, 2 parts of an alkyl ($C_{12}$ to $C_{14}$) sulfonate, 0.2 part of normal dodecyl mercaptan and 0.2 part of potassium persulfate are stirred to an emulsion in a pressure stirring vessel and polymerized for 5 hours under nitrogen at 60° C. After the polymerization is completed, there are added 2,400 parts of desalted water which has been boiled under nitrogen, 800 parts of vinyl chloride, 6 parts of 1.4-butane-diol monoacrylate, 16 parts of an alkyl ($C_{12}$ to $C_{14}$) sulfonate, 2 parts of potassium persulfate, 2 parts of sodium tripolyphosphate and 0.2 part of sodium hyposulfite. The polymerization is carried out at 45° C. and after 24 hours is completed to such an extent that the pressure decreases only very slowly. After degassing the nonpolymerized vinyl chloride, the emulsion is dried on a spray roller drier after the addition of 5 parts of lead stearate. After a treatment on the rollers at 160° C. lasting 5 minutes, an extremely tough sheet is obtained which can be worked up into shaped articles after comminution in the usual way, for example by pressing or extrusion pressing.

Example 10

170 parts of 4-chlorobutyl acrylate, 3 parts of maleic anhydride are dissolved in 200 parts of acetone and polymerized in a pressure stirring vessel under nitrogen at the boiling temperature of the solution after the addition of 0.15 part of azo-isobutyronitrile. After 6 hours there are added to the solution of the polyacrylic acid butyl ester containing anhydride groups, 600 parts of acetone, 4 parts of azo-isobutyronitrile, 5 parts of 1.4-butane-diol monoacrylate and 830 parts of vinyl chloride. The polymerization is carried out in 30 hours at 50° C. The tenacious viscous polymer solution, after the addition of 10 parts of dioctyl-tin-bis-dodecyl mercaptan (stabilizer), is evaporated on a vacuum roller drier. The solid polymer is treated for 5 minutes at 140° C. on a roller apparatus. A very tough and hard sheet is obtained which after comminution can be further worked up to shaped articles in the usual way.

Example 11

170 parts of butyl acrylate and 10 parts of 1.4-butane-diol monoacrylate are dissolved in 180 parts of acetone and, after the addition of 0.2 part of azo-isobutyronitrile, polymerized with a slight acetone reflux. The copolymer is dried by distilling off the acetone, towards the end in vacuo, and dissolved in 820 parts of styrene with the addition of 2 parts of azo-isobutyric acid and 1 part of adipic acid. The solution is polymerized at 80° C. and after the polymerization is completed is heated for 24 hours at 170° C. The white mass is comminuted and charged through a continuous kneader. An impact-resistant granulate is obtained which may be worked up by the usual methods. The impact strength measured on standard test rods amounts to 70 kg. cm. cm.$^{-2}$.

Example 12

I. 55.5 parts of butyl acrylate, 41.7 parts of the acrylic ester of glycol monobutyl ether and 2.8 parts of maleic anhydride are dissolved in 100 parts of acetone and, after the addition of 0.2 part of di-isopropylbenzene hydroperoxide and 0.1 part of dodecyl mercaptan, polymerized with reflux of acetone. From the copolymer solution, such an amount of acetone is distilled off that the solution will still just flow.

II. 99.3 parts of styrene and 0.7 part of 1.4-butane-diol monoacrylate are polymerized in the block until the polymerizing mixture contains 50% of polymer.

III. 17 parts of the very viscous polymer solution I still containing 6% of acetone are supplied at 100° C. together with a mixture of 168 parts of the styrene solution II having a temperature of 140° C. and containing 50% of polymer and 1.6-hexane-diol (0.13 part), in the stated proportions, to a degassing endless screw and comminuted with the aid of a perforated plate at the outlet from the screw.

A granular impact-resistant material is obtained which can be further worked up in the usual way.

Example 13

170 parts of butyl acrylate and 6 parts of acrylic acid are dissolved in 150 parts of acetone and, after the addition of 0.2 part of azo-isobutyronitrile and 0.15 part of normal dodecyl mercaptan, polymerized at refluxing temperature under a nitrogen atmosphere. After 6 hours, the solution is freed from acetone by evaporation, towards the end in vacuo at 120° C. The rubberlike polymer is dissolved in 834 parts of styrene with the addition of 10 parts of 1.4-butane-diol monoacrylate and 3 parts of a polyester derived from adipic acid and ethylene glycol with a hydroxyl number of 116 and an acid number of 2.

300 parts of the solution thus obtained and 700 parts of water are polymerized, with the addition of 10 parts of a 10% aqueous solution of polyvinylpyrrolidone (protective colloid), 0.1 part of sodium tripolyphosphate and 0.5 part of benzoyl peroxide, at 80° C. under nitrogen in aqueous suspension. After about 60 hours the polymerization is completed. The polymer, consisting of small white pellets, is filtered off, washed repeatedly with water and dried in an infra-red tunnel in a nitrogen atmosphere at 130° C. The residence time in the infra-red tunnel is 8 to 12 hours. The material is then treated in a continuous kneader and granulated. The impact strength lies at 60 kg. cm. cm.$^{-2}$.

Example 14

I. An emulsion consisting of 900 parts of desalted water, 300 parts of vinyl chloride, 2 parts of 1.4-butane-diol monoacrylate, 6 parts of an alkyl ($C_{12}$ to $C_{14}$) sulfonate, 2 parts of sodium tripolyphosphate, 0.6 part of potassium persulfate is polymerized under nitrogen for 24 hours at 45° C.

II. An emulsion of 202 parts of butyl arclyate, 98 parts of vinyl chloride, 0.5 part of 1.4-butane-diol monoacrylate, 600 parts of water, 6 parts of an alkyl ($C_{12}$ to $C_{14}$) sulfonate and 0.3 part of potassium persulfate is polymerized at 55° C. for 12 hours under nitrogen.

III. 360 parts of emulsion I are mixed with 40 parts of emulsion II and dried on a roller drier.

IV. 975 parts of butyl acrylate and 25 parts of maleic anhydride are dissolved in 1,000 parts of acetone and, after the addition of 1 part of azo-isobutyronitrile, polymerized under nitrogen at refluxing temperature. The solution, after the end of the polymerization, is evaporated to such an extent that it still just flows at 120° C. It then contains about 10% of acetone.

V. 85 parts of the mixture III and 16 parts of the very viscous polymer IV, with an addition of 1 part of lead stearate, are kneaded in a kneader for 15 minutes at 130°

C. in vacuo. The tough mass is supplied to a roller and removed as a sheet.

Example 15

I. A solution of 295 parts of acrylonitrile, 5 parts of 1.4-butane-diol monoacrylate, 700 parts of styrene in 2,500 parts of methanol, after the addition of 10 parts of polyvinyl pyrrolidone as a protective colloid, and 2 parts of azo-isobutyronitrile as initiator, is polymerized at 65° C. After the polymerization is over, the polymer occurring in the form of fine beads is filtered off, washed with methanol and dried.

II. 970 parts of butyl acrylate and 30 parts of maleic anhydride are dissolved in 1,000 parts of acetone and, after the addition of 1 part of azo-isobutyronitrile, polymerized at refluxing temperature. The polymer solution is freed from acetone by evaporation, towards the end in vacuo.

The two polymers I and II are mixed in a continuous kneader in the ratio I:II=83:17 with an addition of 0.12% of 1.4-butane-diol (with reference to the total amount of polymers) and caused to react.

A material of extreme toughness is obtained which can be further worked up by the usual methods, as for example injection molding.

Example 16

990 parts of normal butyl acrylate and 10 parts of acrylic acid are emulsified in 1,500 parts of desalted water with the addition of 2 parts of sodium alkyl sulfonate ($C_{12}$ to $C_{14}$). After adding 1 part of potassium persulfate as catalyst and 1 part of normal dodecyl mercaptan as regulator, the emulsion is stirred for 5 hours under nitrogen at 40° C. The polymerization is then practically complete (conversion 98 to 99%). The polymer is recovered from the 39 to 40% polymer dispersion by drying.

300 parts of the sticky rubberlike polymer thus obtained, which has a K-value of 105 according to Fikentscher, are dissolved in 1,500 parts of styrene in a vessel provided with a strong mechanical stirrer. A homogeneous solution forms after about 4 hours. Then 30 parts of a mixture of N-(6-isocyanato)-hexyl-acrylamide and its reaction product with hexamethylene di-isocyanate (prepared by reaction of acrylic acid with an excess of hexamethylene di-isocyanate) dissolved in 200 parts of styrene are added. After a few minutes the mixture becomes so viscous that no further stirring is possible.

The stirrer is removed and the mixture heated under nitrogen and under reflux cooling first for 36 hours at 90° C. to 110° C., then for 12 hours at 140° C. and finally for 24 hours at 175° to 180° C.

After cooling, the polymer formed is comminuted and homogenized on rollers for 10 minutes at 140° C. A white sheet is obtained which after comminution yields a friable mass which is injection molded to standard rods. The impact strength amounts to 80 to 100 kg. cm. cm.$^{-2}$ depending on the injection temperature. The Vicat number lies at 98° to 100° C.

Example 17

400 parts of isobutyl acrylate, 200 parts of ethylhexyl acrylate, 200 parts of ethoxyethylhexyl acrylate and 10 parts of 1.4-butane-diol acrylic acid monoester are mixed with 800 parts of acetone and, after the addition of 0.8 part of azo-isobutyronitrile and 0.8 part of dodecyl mercaptan, heated to boiling under nitrogen in a vessel provided with a reflux condenser. The polymerization is over after 6 to 8 hours. The copolymer is separated from acetone. It has a K-value according to Fikentscher of 60.

300 parts of this copolymer are dissolved in 1,500 parts of styrene and mixed with a mixture of 12 parts of 2-isocyanato-ethylmethacrylate (prepared by decomposition of the corresponding urethane with phosphorus pentachloride—see U.S. patent specification No. 2,718,516) and 2.6 parts of hexamethylene di-isocyanate, dissolved in 200 parts of styrene. The viscous solution is polymerized for 36 hours at 110° C., 24 hours at 140° C. (oil bath temperature) and 24 hours at 180° C.

The resultant white mass is comminuted and kneaded for 10 minutes at 140° C. on rollers. It yields injection moldings having impact strength values between 80 and 100 kg. cm. cm.$^{-2}$.

Example 18

1,000 parts of normal butyl acrylate and 40 parts of acrylic acid are mixed with 1,000 parts of acetone and, after the addition of 2 parts of dioctyl-tin-bis-dodecylmercaptide and 1 part of azo-isobutyronitrile, polymerized at 60° C. After 10 hours, the copolymer is dried by distilling off the acetone, towards the end at 140° C. while leading over nitrogen. The rubber-like residue is dissolved in 9,000 parts of styrene. To the solution there are added 57 parts of 1.4-butane-diol monoacrylic acid ester, 12.7 parts of 1.4-butane-diol, 750 parts of xylene and 200 parts of butyl stearate.

The solution is polymerized under nitrogen at increasing temperatures: 24 hours at 110° C., 12 hours at 135° C. and 24 hours at 165° C.

The white mass thus obtained is comminuted after cooling and freed from xylene by treatment for 24 hours at 180° C. in vacuo (1 mm. Hg). After passing through a double endless screw machine, the threadlike material is comminuted. The technical properties in use correspond to those of Example 2.

Example 19

150 parts of a rubberlike copolymer derived from 96 parts of normal butyl acrylate and 4 parts of acrylic acid (prepared by solution polymerization in acetone) are dissolved in 850 parts of styrene and, after being mixed with 1.3 parts of 1.6-hexane-diol, 20 parts of butyl stearate and 100 parts of ethylbenzene, polymerized under nitrogen at increasing temperature: 24 hours at 95° C., 12 hours at 110° C., 12 hours at 140° C. and 12 hours at 165° C.

After cooling, the mass is comminuted and freed from ethylbenzene by treatment for 24 hours in vacuo at 180° C.

The polymer free from solvent is kneaded for 7 minutes on rollers. An injection molding composition is obtained with an impact strength, measured on standard test rods, of an average of 65 kg. cm. cm.$^{-2}$.

Example 20

I. 1,000 parts of normal-butyl acrylate, 0.25 part of 1.4-butane-diol diacrylate, 2,000 parts of water, 2 parts of an alkyl sulfonate ($C_{12}$ to $C_{14}$), 1.5 parts of potassium persulfate and 1 part of dodecylmercaptan are stirred to form an emulsion and then polymerized at 65° C. for 6 hours under nitrogen. The polymer dispersion is precipitated with 5% common salt solution, washed with water and dried.

II. 500 parts of normal-butyl acrylate, 500 parts of acrylonitrile, 0.25 part of 1.4-butane-diol diacrylate, 5 parts of an alkyl sulfonate ($C_{12}$ to $C_{14}$), 1.5 parts of potassium persulfate and 1 part of dodecylmercaptan are stirred to form an emulsion and polymerized at 60° C. for 6 hours under nitrogen. The polymer dispersion is precipitated with 5% common salt solution, washed with water and dried.

III. 700 parts of styrene, 300 parts of acrylonitrile, 5 parts of an alkyl sulfonate ($C_{12}$ to $C_{14}$), 1.5 parts of potassium persulfate and 1 part of dodecylmercaptan are stirred to form an emulsion and then polymerized at 70° C. for 6 hours under nitrogen. The polymer dispersion is precipitated by addition of 5% common salt solution, washed with water and dried.

200 parts of polymer I, 100 parts of polymer II and 700 parts of polymer III are mixed at 140° C. for 10 minutes in a roller mill the cylinders of which rotate at different speeds. The mixture is comminuted and if processed by any of the conventional methods, for instance by the injection molding method, gives moldings of high impact strength.

Example 21

I. An emulsion consisting of 960 parts of butyl acrylate, 40 parts of 1.4-butane-diol diacrylate, 2,000 parts of water, 5 parts of an alkyl sulfonate ($C_{12}$ to $C_{14}$) and 1 part of potassium persulfate is stirred at 50° C. for 6 hours under nitrogen, a rubber-like cross-linked copolymer being obtained.

II. An emulsion consisting of 4,560 parts of styrene, 9,000 parts of water, 45 parts of an alkyl sulfonate ($C_{12}$ to $C_{14}$), 4.5 parts of potassium persulfate and 2.5 parts of dodecylmercaptan is polymerized at pH 10 for 4 hours at 70° C. under nitrogen, a stable polystyrene dispersion being obtained.

3 parts of dispersion I and 13.6 parts of dispersion II are mixed and dried on a roller drier.

The finely granulated mixture so obtained is kneaded in a friction type roller system (gap between the rollers 0.1 mm.) at 140° C. for 10 minutes. It can then be molded by any method conventionally employed with thermoplastic materials, for example by the injection-molding method, yielding materials of high mechanical strength with no ageing phenomena.

Example 22

1,000 parts of butyl acrylate, 30 parts of the diallyl ester of fumaric acid, 2,000 parts of water, 10 parts of an alkyl sulfonate ($C_{12}$ to $C_{14}$) and 1.5 parts of potassium persulfate are polymerized at 40° C. for 10 hours under nitrogen.

3,220 parts of the copolymer dispersion so prepared are made into an emulsion with 5,100 parts of styrene, 50 parts of an alkyl sulfonate ($C_{12}$ to $C_{14}$), 5 parts of potassium persulfate, 2.5 parts of dodecylmercaptan and 10,200 parts of water and the emulsion is polymerized at 80° C. for 4 hours under nitrogen.

The dispersion obtained is dried on a spray roller drier and the dry polymer is treated on a friction type roller system at 140° C. for 10 minutes. From the comminuted material articles of good mechanical values can be made by injection molding.

Example 23

950 parts of butyl acrylate, 50 parts of maleic anhydride, 1 part of azoisobutyric acid nitrile, 0.2 part of dodecylmercaptan and 1,000 parts of acetone are polymerized for 8 hours at reflux temperature under nitrogen. The viscous solution is evaporated under nitrogen.

150 parts of the rubberlike polymer so obtained are dissolved in 850 parts of styrene and the solution, after adding 3 parts of 1.4-butane-diol as a cross-linking agent and 1 part of azoisobutyric acid nitrile, is polymerized under nitrogen, first at 60° C. for 24 hours, then at 140° C. for 12 hours and finally at 180° C. for 12 hours.

The polymer is treated on a friction type roller system at 140° C. for 10 minutes and comminuted. Standard tests bars made of the polymer have an impact strength of 80 kg. cm. cm.$^{-2}$ (molding temperature 175° C.) and a Vicat dimensional stability under heat between 98° to 100° C.

Example 24

I. 920 parts of butyl acrylate, 70 parts of acrylic acid and 10 parts of styrene are dissolved in 1,000 parts of acetone and the solution, 1 part of azoisobutyric acid nitrile having been added, is polymerized for 8 hours at reflux temperature under nitrogen. The solution is then evaporated and the viscous rubberlike polymer is dried in vacuo.

II. 150 parts of the copolymer so prepared are mixed with 50 parts of a polyester (hydroxyl number 91; acid value 3) made of ethylene glycol and adipic acid, and 800 parts of polystyrene (block polymer) in a kneading screw.

The products obtained have a medium impact strength and a good dimensional stability under heat.

Example 25

200 parts of the copolymer obtainable from butyl acrylate, acrylic acid and styrene as described in section I of the foregoing example are dissolved in 800 parts of styrene and then, 2.5 parts of hexamethylene diisocyanate having been added, the solution is polymerized first at 80° to 100° C. for 24 hours, then at 140° C. for 24 hours and finally at 180° C. for 12 hours under nitrogen. The comminuted material is treated at 140° C. for 5 minutes on a friction type roller system and extruded to standard test bars. The average impact strength of the bars produced at varying temperatures is 65 kg. cm. cm.$^{-2}$.

Example 26

An emulsion prepared by mixing 900 parts of isobutyl acrylate, 60 parts of styrene, 40 parts of acrylic acid, 2,000 parts of water, 10 parts of an alkyl sulfonate, 1.5 parts of potassium persulfate and 1 part of normal-dodecylmercaptan is polymerized at 50° C. for 6 hours under nitrogen. The polymer dispersion is combined with methanol, the precipitated copolymer is washed with methanol and dried in vacuo.

150 parts of the said copolymer are dissolved in 850 parts of methyl methacrylate and, after adding 1 part of azoisobutyric acid nitrile and 2.5 parts of hexamethylene diisocyanate, the solution is polymerized under nitrogen at 70° C. between chrome-plated metal plates spaced apart at a distance of 4 millimeters. The product is then heated to 170° C. for 12 hours under nitrogen. The comminuted material is cylindered at 145° C. for 5 minutes. It lends itself well to injection molding yielding articles with outstanding mechanical properties.

Example 27

I. An emulsion consisting of 2,000 parts of water, 10 parts of an alkyl sulfonate ($C_{12}$ to $C_{14}$), 950 parts of butyl acrylate, 50 parts of acrylic acid, 2.5 parts of 1.4-butane-diol diacrylate, 1 part of potassium persulfate and 2.5 parts of dodecyl mercaptan is polymerized at 60° C. for 4 hours under nitrogen.

II. An emulsion consisting of 2,000 parts of water, 10 parts of an alkyl sulfonate ($C_{12}$ to $C_{14}$), 530 parts of butyl acrylate, 430 parts of styrene, 40 parts of 1.4-butane-diol monoacrylate and 1 part of potassium persulfate is polymerized at 60° C. for 4 hours under nitrogen.

III. An emulsion consisting of 2,000 parts of water, 10 parts of an alkyl sulfonate ($C_{12}$ to $C_{14}$), 1,000 parts of styrene, 1 part of potassium persulfate and 1 part of dodecylmercaptan is polymerized at 70° C. for 6 hours at a pH value between 8 and 9 under nitrogen.

A mixture of 150 parts of emulsion I, 150 parts of emulsion II and 700 parts of emulsion III is evaporated on a spray roller drier and the gritty powder is imparted a fine-grained consistency by treatment in a screw. The fine-grained material is placed in a vacuum drying cabinet, kept therein at 160° C. for 12 hours and then cylindered at 140° C. for 10 minutes.

The product obtained is a homogeneous white plastic mass from which articles with outstanding mechanical properties can be manufactured by injection molding or deep drawing in vacuo.

Example 28

940 parts of methyl acrylate and 60 parts of 1.6-hexanediol monoacrylate are mixed with 1,500 parts of acetone and 1 part of normal-dodecylmercaptan. After adding 1 part of azoisobutyric acid nitrile the solution is polymerized at between 60° and 55° C. for 10 hours. The viscous polymer solution is dried by distilling off the acetone.

200 parts of the polymer solution so obtained are dissolved in 800 parts of methyl methacrylate, while adding 6.5 parts of methacrylic acid, 2 parts of phthalic anhydride and 1 part of benzoyl peroxide. The solution is polymerized between chrome-plated metal plates at 75° C. The plastic sheets so prepared are shredded and heated at 135° C. for 12 hours in vacuo (1 mm. Hg). The sintered mass is again comminuted and processed on a roller system at 140° C. for 10 minutes. The molding compound obtained can be processed in conventional manner, for example by injection molding, into articles of high impact strength.

*Example 29*

A mixture of 600 parts of isobutylene, 400 parts of isobutylvinylether, 2.5 parts of divinylbenzene and 800 parts of liquid propane is made to polymerize by the addition of 1 part of boron fluoride dissolved in 200 parts of liquid propane. The spongy rubber compound is washed with a mixture of equal parts of methanol and water and dried.

150 parts of the rubber-like copolymer so obtained and 850 parts of polystyrene are mixed in a roller mill at 140° C. for 15 minutes. Articles made of the molding compound so obtained by conventional methods, for example by injection molding, are distinguished by a high impact strength.

*Example 30*

150 parts of a rubber-like copolymer from 99.8 parts of vinyl ether of ethylene glycol-mono-isobutylether and 0.2 part of ethylene glycol-divinyl ether, prepared by polymerization in liquid propane as described in the preceding example, are mixed in an endless kneader with 850 parts of a hard polymer of decalylvinyl ether. The material obtained can be processed into plates and sheets of high impact strength.

*Example 31*

997 parts of the acrylic acid ester of ethylene glyocl monomethyl ether and 3 parts of ethylene glycol dimethacrylic acid ester are emulsified with 2,000 parts of desalted water, 5 parts of "Dresinate" soap (an emulsifier on colophony basis), 1.5 parts of azoisobutyric acid nitrile and 1 part of dodecyl mercaptan and the emulsion is polymerized at 65° C. for 6 hours.

500 parts of the polymer dispersion so obtained are mixed with 500 parts of a polystyrene dispersion of even concentration, which has also been prepared by emulsion polymerization, and the mixture is dried on a roller drier.

400 parts of this mixture are combined with 600 parts of a styrene bulk polymer at 145° C. in an endless kneader. The polystyrene obtained can be used for making articles of high impact strength by any conventional method.

I claim:

1. An impact-resistant plastic composition comprising (1) a rigid polyvinyl compound containing more than 50% by weight of a compound selected from the group consisting of styrene, alkyl styrenes, and halogenated styrenes, and (2) an elastomeric acrylic acid ester polymer having a maximum diene content of about 2% by weight of said composition, said elastomeric polymer being cross-linked with at least one member selected from the group consisting of additional molecules of elastomeric polymer, and molecules of said rigid polyvinyl compound, the proportion of said elastomeric polymer being from about 3% to about 50% by weight based on the weight of the composition.

2. A composition as in claim 1 wherein said elastomeric polymer is cross-linked intramolecularly.

3. A composition as in claim 1 wherein said elastomeric polymer is cross-linked intermolecularly with said rigid polyvinyl compound.

4. A composition as in claim 1 wherein said elastomeric polymer is both intramolecularly cross-linked and intermolecularly cross-linked with said rigid compound.

5. A process for the production of an impact-resistant plastic composition which comprises adding an elastomeric acrylic acid ester polymer having a maximum diene content of about 2% by weight of said composition to a rigid polystyrene compound, said elastomeric polymer being cross-linked with at least one member selected from the group consisting of additional molecules of elastomeric polymer, and molecules of said rigid polystyrene compound, the proportion of said elastomeric polymer being from about 3% to about 50% by weight based on the weight of the composition.

6. A process for the production of an impact-resistant plastic composition which comprises dissolving an intramolecularly cross-linked elastomeric acrylic acid ester polymer having a maximum diene content of about 2% by weight of said composition in a vinyl monomer selected from the group consisting of styrene, alkyl styrenes, and halogenated styrenes, and thereafter polymerizing said vinyl monomer to form a linear polyvinyl compound mixed with said intramolecularly cross-linked elastomeric polymer, the proportion of said elastomeric polymer being from about 3% to about 50% by weight based on the weight of the composition.

7. A process for the production of an impact-resistant plastic composition which comprises dissolving an elastomeric acrylic acid ester polymer having a maximum diene content of about 2% by weight of said composition in a vinyl monomer selected from the group consisting of styrene, alkyl styrenes, and halogenated styrenes, said elastomeric acrylic acid ester polymer containing unreacted and different functional groups which are capable of reacting with each other, said functional groups being selected from the group consisting of hydroxyl, carboxylic, acid anhydride, acid amide, amino, epoxy, and isocyanate groups, and thereafter (1) polymerizing said vinyl monomer to form a linear polyvinyl compound, and (2) causing a cross-linking reaction between said different functional groups within said elastomeric acrylic acid ester polymer, the proportion of said elastomeric polymer being from about 3% to about 50% by weight based on the weight of the composition.

8. A process for the production of an impact-resistant plastic composition which comprises dissolving an intramolecularly cross-linked elastomeric acrylic acid ester polymer having a maximum diene content of about 2% by weight of said composition in a vinyl monomer selected from the group consisting of styrene, alkyl styrenes, and halogenated styrenes, said cross-linked elastomeric acrylic acid ester polymer containing unreacted functional groups selected from the group consisting of hydroxyl, carboxylic, acid anhydride, acid amide, amino, epoxy, and isocyanate groups, and thereafter polymerizing said vinyl monomer in the presence of another monomer which is copolymerizable with said vinyl monomer and which contains functional groups selected from the group consisting of hydroxyl, carboxylic, acid anhydride, acid amide, amino, epoxy, and isocyanate groups, whereby said copolymerized monomers are cross-linked with said intramolecularly cross-linked elastomeric acrylic acid ester polymer, the proportion of said elastomeric polymer being from about 3% to about 50% by weight based on the weight of the composition.

9. A process as in claim 8 wherein said polymerization is carried out in the presence of a nonpolymerizable compound having a plurality of functional groups which are reacted with the functional groups within said elastomeric acrylic acid ester polymer and the functional groups of said other monomer, said functional groups of said nonpolymerizable compound being selected from the group consisting of hydroxyl, carboxylic, acid anhydride, acid amide, amino, epoxy, and isocyanate groups, the proportion of said elastomeric polymer being from about 3% to about 50% by weight based on the weight of the composition.

10. A process for the production of an impact-resistant plastic composition which comprises dissolving an elastomeric acrylic acid ester polymer having a maximum diene content of about 2% by weight of said composition in a vinyl monomer selected from the group consisting of styrene, alkyl styrenes, and halogenated styrenes, said elastomeric acrylic acid ester polymer containing unreacted functional groups, said functional groups being selected from the group consisting of hydroxyl, carboxylic, acid anhydride, acid amide, amino, epoxy, and isocyanate groups, and thereafter polymerizing said vinyl monomer in the presence of a non-polymerizable compound having a plurality of functional groups which functional groups react with the functional groups of said elastomeric acrylic acid ester polymer to provide intramolecular cross-linking of said elastomeric acrylic acid ester polymer, the proportion of said intramolecularly cross-linked elastomeric polymer being from about 3% to about 50% by weight based on the weight of the composition.

11. A process for the production of an impact-resistant plastic composition which comprises dissolving an elastomeric acrylic acid ester polymer having a maximum diene content of about 2% by weight of said composition in a vinyl monomer selected from the group consisting of styrene, alkyl styrenes, and halogenated styrenes, said elastomeric acrylic acid ester polymer containing unreacted functional groups selected from the group consisting of hydroxyl, carboxylic, acid anhydride, acid amide, amino, epoxy, and isocyanate groups, and thereafter polymerizing said vinyl monomer in the presence of another monomer which is copolymerizable with said vinyl monomer and which contains functional groups selected from the group consisting of hydroxyl, carboxylic, acid anhydride, acid amide, amino, epoxy, and isocyanate groups, which functional groups are capable of reacting with the functional groups of said elastomeric acrylic acid ester polymer to form intermolecular cross-linking, said polymerization being carried out in the presence of a nonpolymerizable compound having a plurality of functional groups, said functional groups being capable of reacting with the functional groups of said elastomeric acrylic acid ester polymer to form intramolecular cross-linking of said elastomeric polymer, the proportion of said elastomeric polymer being from about 3% to about 50% by weight based on the weight of the composition.

12. A process for the production of an impact-resistant plastic composition which comprises dissolving a copolymer or butyl acrylate and a minor proportion of one member selected from the group consisting of 1,4-butanediol monoacrylate and acrylic acid, in a mixture of styrene and a minor proportion of the remaining member of said group, the proportion of said butyl acrylate polymer being from 3% to 50% by weight of said composition, polymerizing said mixture, and reacting the hydroxyl groups on one of the resulting polymers with the carboxyl groups on the other.

13. A process as defined in claim 12 wherein said mixture additionally contains a minor proportion of 1,4-butanediol which is reacted with the carboxyl groups on said other polymer.

References Cited in the file of this patent

UNITED STATES PATENTS

| | | |
|---|---|---|
| 2,320,924 | Gift | June 1, 1943 |
| 2,539,376 | Staudinger et al. | Jan. 23, 1951 |
| 2,539,377 | Staudinger et al. | Jan. 23, 1951 |
| 2,609,353 | Rubens et al. | Sept. 2, 1952 |
| 2,610,962 | Smyers et al. | Sept. 16, 1952 |
| 2,662,870 | Allenby | Dec. 15, 1953 |
| 2,698,838 | Simon et al. | Jan. 4, 1955 |
| 2,788,288 | Reinfrank et al. | Apr. 9, 1957 |
| 2,835,646 | Sell | May 20, 1958 |
| 2,837,496 | Vandenberg | Jan. 3, 1958 |
| 2,852,565 | Nozaki | Sept. 16, 1958 |
| 2,926,126 | Graham et al. | Feb. 23, 1960 |

FOREIGN PATENTS

| | | |
|---|---|---|
| 679,562 | Great Britain | Sept. 17, 1952 |
| 521,038 | Canada | Jan. 24, 1956 |

UNITED STATES PATENT OFFICE

CERTIFICATE OF CORRECTION

Patent No. 3,055,859 September 25, 1962

Bruno Vollmert

It is hereby certified that error appears in the above numbered patent requiring correction and that the said Letters Patent should read as corrected below.

Column 17, line 41, for "glyocl" read -- glycol --; column 20, line 10, for "or" read -- of --; line 33, for "Reinfrank" read -- Rheinfrank --.

Signed and sealed this 11th day of June 1963.

(SEAL)
Attest:

ERNEST W. SWIDER
Attesting Officer

DAVID L. LADD
Commissioner of Patents